Patented Dec. 1, 1942

2,303,551

UNITED STATES PATENT OFFICE 2,303,551

SOLVENT COMPOSITION

Augustus S. Houghton, Rivervale, N. J., assignor, by mesne assignments, to Allied Chemical & Dye Corporation, a corporation of New York No Drawing. Application September 18, 1940, Serial No. 357,314

5 Claims. (Cl. 252—364)

This invention relates to solvents, and more particularly to an improvement in solvents of the cyclohexanol type.

Cyclohexanol produced by the hydrogenation of phenol possesses unique solvent properties and is particularly adapted for use as a solvent for numerous industrial purposes. For example, it finds wide application as a soap solvent for cleaning in the textile industry and is also useful in the lacquer industry, and in the manufacture of printing inks. However, the use of cyclohexanol as a solvent is subject to the disadvantage that the pure material crystallizes at a relatively high temperature (about 25° C. corresponding to about 77° F.) and its high freezing-point characteristic renders it objectionable owing to its tendency to solidify during storage, shipment, and use in cold weather with the result that many solvent users purchase other inferior solvents and avoid use of cyclohexanol for applications for which, aside from its tendency to solidify in moderate weather, it would be eminently suited. In some cases, impurities such as phenol, water and cyclohexane present in the reaction mixtures from converters in which hydrogenation of phenol to produce cyclohexanol is effected are permitted to remain in the cyclohexanol. While such impurities depress the freezing point of cyclohexanol, they have the disadvantage of adversely affecting its solvent properties. Furthermore, their vapor pressures differ widely from that of the cyclohexanol and hence detrimentally affect the solvent for some purposes, e. g. where rate of evaporation, flashpoint, etc., are important. Moreover, any water and phenol dissolved in cyclohexanol promote corrosion of the metal containers commonly used for storage and shipment of the material resulting in introduction of objectionable color and sediment into the normally colorless and clear cyclohexanol. Cyclohexanone may also be present as an impurity in cyclohexanol, but is undesirable because of its low viscosity and chemical properties. For example, in common with all ketones it possesses high reactivity typified by a tendency to form condensation and addition products even in solutions containing only a fraction of a per cent of the ketone.

It is an object of the invention to lower the freezing point of cyclohexanol so that it remains in liquid condition at low atmospheric temperatures without substantially affecting its solvent properties.

It is a further object of the invention to provide a novel composition of low freezing point and substantially identical with cyclohexanol with respect to solvent properties, chemical properties and significant physical characteristics such as viscosity and rate of evaporation. Other objects and advantages will appear hereinafter.

In accordance with the invention, cyclohexanol is blended with substituted cyclohexanols containing low alkyl substituents in proportions to produce mixtures containing from 99 mol per cent to 85 mol per cent, preferably from 98 mol per cent to 90 mol per cent, of cyclohexanol and from 1 mol per cent to 15 mol per cent, preferably from 2 mol per cent to 10 mol per cent of substituted cyclohexanol. Among the substituted cyclohexanols that may be employed may be mentioned 2-methyl cyclohexanol, 3-methyl cyclohexanol, and 4-methyl cyclohexanol obtained by hydrogenating ortho-cresol, meta-cresol, and para-cresol, respectively, the dimethyl cyclohexanols produced by hydrogenating xylenols, menthol (5-methyl-2-isopropyl cyclohexanol-1) and carvomenthol (6-methyl-3-isopropyl cyclohexanol-1) and other substituted cyclohexanols containing from 1 to 5 alkyl substituents, each having not more than five carbon atoms. Preferably, the methyl cyclohexanols obtained, for example by hydrogenating cresols, are utilized. Commercial methyl cyclohexanols, such as mixtures of 3-methyl and 4-methyl cyclohexanols produced by hydrogenating mixtures of meta- and paracresols, are eminently suitable for admixture with cyclohexanols.

I have found that the addition of low alkyl substituted cyclohexanols to cyclohexanol greatly depresses the freezing point of the cyclohexanol without materially affecting its solvent properties. For example, the solvent blend constituted of about 90.2 mol per cent of cyclohexanol and about 9.8 mol per cent of methyl cyclohexanol has a freezing point of about −16° C. as compared with the freezing point of about +25° C. of pure cyclohexanol. Such blends possess substantially the same solvent and viscosity characteristics and evaporation rate as cyclohexanol and may be employed in processes for which cyclohexanol solvent is used without changing the formulas, or otherwise departing from the procedure followed when cyclohexanol alone is employed. For example, in textile cleaning operations, mixtures of cyclohexanol and methyl cyclohexanol may be used interchangeably with cyclohexanol as a soap solvent.

As illustrative of solvent compositions in accordance with the invention, the following examples are given. The cyclohexanol constituent of the examples was a commercial specimen having a freezing point of 24° C.; the methyl cyclohexanol constituent of Examples 1 to 5 inclusive was a mixture of 3-methyl and 4-methyl cyclohexanols produced by hydrogenating a mixture of meta- and para-cresols.

|  | 1 | 2 | 3 | 4 | 5 | 6 |
|---|---|---|---|---|---|---|
| Commercial cyclohexanol parts by weight | 96 | 94 | 93 | 92 | 89 | 98 |
| Methyl cyclohexanol_do | 4 | 6 | 7 | 8 | 11 | |
| Methyl cyclohexanol mol per cent | 3.6 | 5.3 | 6.2 | 7.1 | 9.8 | |
| Menthol (5-methyl-2-isopropyl cyclohexanol-1) parts by weight | | | | | | 2 |
| Menthol mol per cent | | | | | | 1.29 |
| Freezing point of composition °C | 12 | 4.5 | 2 | −4 | −16 | 18 |

It will be observed that the larger the proportion of the substituted cyclohexanol blended with the cyclohexanol the more the freezing point of the cyclohexanol is depressed, so that the amount of substituted cyclohexanol utilized may be varied depending upon the temperature conditions under which the solvent is intended to be used; e. g., more methyl cyclohexanol may be blended with the cyclohexanol if the solvent is employed in severe winter weather than if it is used under milder temperature conditions. As aforementioned, the low freezing point cyclohexanol compositions of the invention may be utilized for solvent purposes for which cyclohexanol is ordinarily employed. For example, the composition of Example 4, constituted of a blend of 92 parts by weight of cyclohexanol and 8 parts of methyl cyclohexanol, was substituted for the cyclohexanol in the following formula for a dry cleaning prespotter:

|  | Per cent |
|---|---|
| Ammonium oleate | 25 |
| Cyclohexanol | 25 |
| Water | 10 |
| Naphtha | 30 |
| Carbon tetrachloride | 10 |

It was found that the solvent properties of the blend were practically indistinguishable from those of cyclohexanol alone.

Similarly the compositions of this invention may be substituted directly for cyclohexanol wherever it is used in cellulose ester dispersions, such as spraying lacquers, printing inks, etc. in which the viscosity characteristics are maintained within definite limits.

Thus it will be seen that the present invention provides a process of depressing the freezing point of cyclohexanol, so that it does not solidify in cold weather, without detrimentally affecting its solvent and chemical properties or materially changing its significant physical characteristics. Owing to the marked similarity in the chemical and solvent properties of cyclohexanol and substituted cyclohexanols containing low alkyl substituents, compositions produced in accordance with the invention are practically indistinguishable from commercially pure cyclohexanol in so far as solvent properties are concerned and possess the highly valuable characteristic that they may be employed throughout the range of temperatures ordinarily encountered in temperate climates without solidifying during storage, shipment, and use.

Since certain changes may be made without departing from the scope of the invention, it is intended that the above shall be interpreted as illustrative and not in a limiting sense.

I claim:

1. A solvent composition having substantially the solvent properties of cyclohexanol comprising a blend of a major proportion of cyclohexanol and from 1 mol per cent to 15 mol per cent of substituted cyclohexanol containing from one to five alkyl substituents each having not more than five carbon atoms, said solvent composition having a materially lower freezing point than cyclohexanol.

2. An improved solvent composition having substantially the solvent and boiling characteristics of cyclohexanol comprising a blend of a major proportion of cyclohexanol and a minor proportion of methyl cyclohexanol, said solvent composition having a materially lower freezing point than cyclohexanol.

3. An improved solvent composition having substantially the solvent and boiling characteristics of cyclohexanol and having a materially lower freezing point than cyclohexanol, said composition comprising from 99 mol per cent to 85 mol per cent of cyclohexanol, and from 1 mol per cent to 15 mol per cent of methyl cyclohexanol.

4. An improved hydrogenated solvent composition having substantially the solvent and boiling characteristics of cyclohexanol consisting substantially entirely of a mixture of 99 mol per cent to 85 mol per cent of hydrogenated phenol and from 1 mol per cent to 15 mol per cent of hydrogenated cresol.

5. An improved solvent composition having substantially the solvent properties of cyclohexanol comprising a blend of a major proportion of cyclohexanol and a minor proportion of menthol, said solvent composition having a materially lower freezing point than cyclohexanol.

AUGUSTUS S. HOUGHTON.